Oct. 27, 1942.  L. B. HALL  2,300,252
HAEMACYTOMETER
Filed Dec. 20, 1940
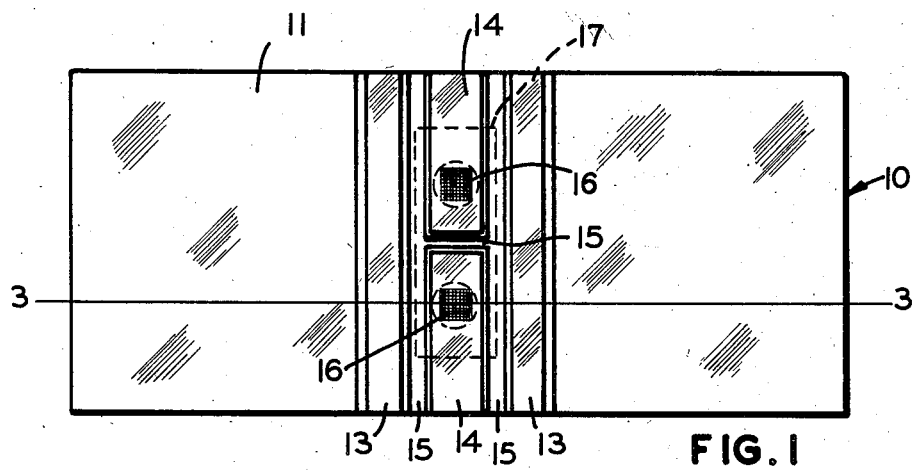
FIG. 1
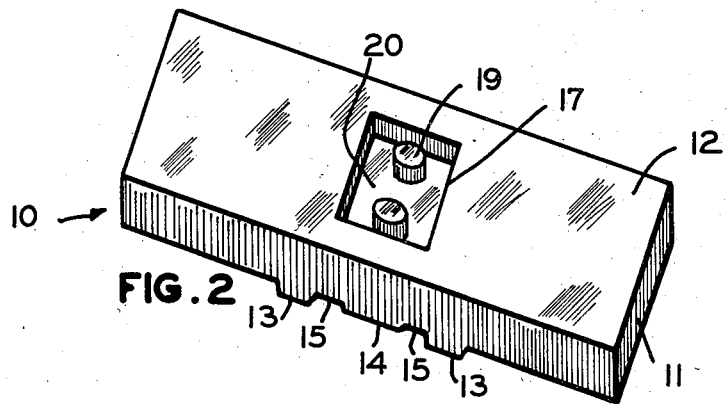
FIG. 2
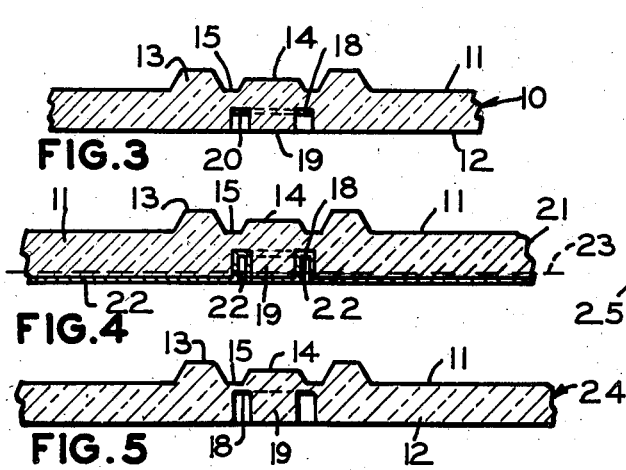
FIG. 3
FIG. 4
FIG. 5
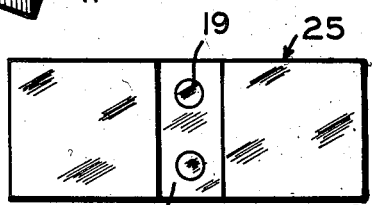
FIG. 6
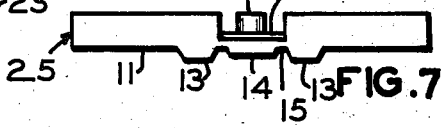
FIG. 7
Leigh B. Hall
INVENTOR
BY
ATTORNEYS Patented Oct. 27, 1942

2,300,252

UNITED STATES PATENT OFFICE 2,300,252

HEMACYTOMETER

Leigh B. Hall, Rochester, N. Y., assignor to Bausch & Lomb Optical Company, Rochester, N. Y., a corporation of New York Application December 20, 1940, Serial No. 371,018

2 Claims. (Cl. 88—40)

The invention relates to apparatus for holding an object for microscopic examination and more particularly has reference to hemacytometers, counting chambers and similar tyes of devices.

Hemacytometers have one or more ruled areas engraved upon their top surfaces. Each ruled area is composed of a multiplicity of minute squares arranged in the form of an extremely small grid. Frequently, for example, a ruled area is only 3 mm. on a side.

As is well known, the field of view of a microscope, even for low powers, is of a very limited size which reaches minute proportions at high magnifications. To illustrate, a commonly used combination for low power work consisting of a 16 mm. 10x objective and an eyepiece having a magnification of 5x provides a field of view which is only slightly greater than 2 mm. in diameter In practice, the proper positioning of the relatively small ruled area takes place with the microscope in an unfocused condition. When these facts are recalled, the difficulties encountered by a microscopist in locating a hemocytometer on the stage of a microscope will at once become apparent.

A number of locating means for hemacytometers have been developed by the prior art. While a few of these devices have attained their inventive concept by providing an operable structure, they have nevertheless possessed certain disadvantages as is evidenced from their lack of popularity. This has been caused, for one thing, by the prior art expedient of cementing or fusing the locating means to the body of the hemacytometer in exposed positions unprotected from possible harm. Such an expedient is subject to the justifiable criticism that bonds of such nature are frequently broken by contacting physical force and often become loosened with age. Another factor contributing to the lack of commercial success of this type of prior art device has been its excessive cost due to the expensive construction practices and methods necessary to produce its complicated design.

Hence my invention holds for its primary object the provision of a hemacytometer of the type having means for locating its ruled area in the field of a microscope which lacks those disadvantages and defects inherent in devices heretofore developed by the art.

An equally important object of my invention resides in the provision of a hemacytometer of simple one-piece construction which has means thereon designed to allow its ruled area to be readily located in the field of view of a microscope.

Another object is to provide a hemacytometer whose body is divided into a plurality of visually distinguishable portions.

Still another object of my invention is the provision of a hemacytometer whose body is divided into a plurality of visually distinguishable portions which are in surrounding relation to each other, at least one of these portions having a ruled area formed thereon.

As a further object, my invention intends to provide a means for making use of the difference in light transmittance of different portions of the transparent body of a hemacytometer to cause these portions to appear in such visual contrasting relation that an observer may readily discern when a portion is located in the field of view of a microscope.

With these and other objects in view, which may be incident to my improvements, the invention consists in the parts and combinations to be hereinafter set forth and claimed, with the understanding that the several necessary elements comprising my invention may be varied in construction, proportion and arrangement without departing from the spirit of the invention and the scope of the claims.

In order to make my invention more clearly understood, I have shown in the accompanying drawing means for carrying the same into practical effect without limiting the improvements in their useful applications to the particular constructions which, for the purpose of explanation, have been made the subject of illustration. To this end the invention is disclosed in the following manner, wherein:

Figure 1 is a plan view of a hemacytometer forming the subject matter of my invention.

Figure 2 is a perspective view of the hemacytometer of Figure 1 with the device positioned so that its bottom surface is uppermost.

Figure 3 is a vertical sectional view on the line 3—3 of Figure 1.

Figure 4 is a vertical sectional view showing a hemacytometer similar to that of Figure 1 but produced by a modified form of construction practice.

Figure 5 is a vertical sectional view of a modified type of hemacytometer.

Figure 6 is a bottom plan view of still another type of hemacytometer, and

Figure 7 is a side elevation of Figure 6 and shows the hemacytometer turned so that the counting chamber face is the lowermost surface.

Referring to the drawing in which like reference characters designate similar parts throughout the several views, there is shown in Figures 1 through 3 a hemacytometer having a body 10 which has the upper surface 11 and lower surface 12. The body 10 is formed of any suitable clear transparent material, clear glass being suitable for this purpose, and is shaped to the configuration or contour disclosed in the drawing by any conventional molding or pressing process.

On the upper surface 11 of the hemacytometer there are provided the usual raised and spaced apart ribs 13 adapted to support a cover glass (not shown) over the two usual centrally and symmetrically located tables 14 of substantially equal size which are separated by the moats or grooves 15. On each table 14 there is engraved a ruled area 16 in the form of the usual grid design employed in devices of this type. Each ruled area is positioned so that its center lies on the longitudinal center line of its corresponding table at equal distances from the long edge of the hemacytometer.

The bottom surface 12 of the body has a recess 17 molded therein as is best shown in Figures 1 and 2. Recess 17 is provided with a roof portion 18. The roof need not possess a plane surface as shown but may be given any other contour lending itself to the fulfillment of my inventive aims. Generally, although not necessarily, the recess 17 is of rectangular shape and is located so that its center is at the center of the body 10 beneath the tables 14. In size, recess 17 is sufficiently long to extend under both tables 14 well beyond the edge of each ruled area to points equidistant from the long edge of the body 10 while it is of a sufficient width to extend beyond each side of the tables for equal amounts.

In molding the hemacytometer body, buttons 19, one for each ruled area 16, are formed to depend from the roof portion 18. Each button 19 is arranged in a position which is normal to the top surface 11 and is located directly below a ruled area so that it is centered with respect thereto. These buttons depend for a distance equal to the depth of the recess 17 so that their lower ends, which are flat surfaces, lie in the plane of the main support portion of the lower surface 12 on each side of the recess of the hemacytometer body. The cross section of each button 19 may be circular, square or rectangular in shape and is preferably somewhat larger than a ruled area so that it will overlap the latter by a slight amount.

As may be noted, the roof portion entirely surrounds the circular base of each button 19 and provides a relatively wide border between the peripheries of the buttons and the sides of the recess. This surrounding area of the roof portion is coated with any suitable stain which after application is glazed in any well known manner to provide a light filter 20 on the surface of the roof portion. For the purposes of illustration, the thickness of the filter 20, which in actuality is relatively minute, is shown as exaggerated in Figure 3. The stain selected may be of any well known color suitable for conducting microscopic examination. For example, where the hemacytometer has a clear body, I can employ a green, amber or blue stain for the filter. Also the hemacytometer may have its body formed of colored transparent material and its filter of a contrasting color. Any suitable combination of colors may be used in this latter instance, as an example of which a blue hemacytometer body may be provided with an amber colored filter.

As a result of the foregoing construction, the hemacytometer body will quite obviously appear to the eye to be divided into surrounding portions or sections which are in distinct visual contrast. For example, where a transparent body of the type of Figures 1 and 3 is provided with an amber filter there will be an intermediate amber portion through the body of the hemacytometer from the filter area of the recess 17 upwardly to the top surface 11 of the body 10. This amber portion surrounds inner portions, formed by the buttons 19 and that part of the body 10 in vertical alignment with them, on which the ruled areas 16 are engraved. The amber or intermediate portion is in turn surrounded by an outer portion which is composed of the remainder of the body 10 of the hemacytometer.

Whether the body is of clear or colored material, if the filter 20 is given a distinctive hue, it will be apparent that while the inner portions surrounding the ruled areas and the outer portion surrounding the recess may appear alike, these portions will be seen in sharp visual contrast to the intermediate colored or filter portion. Some diffusion of the light passing through the filter may be expected. Detrimental coloring of the ruled areas by this diffused light may, however, be prevented by providing each button with a cross sectional area which in general practice is greater than that of its ruled area and by making the recess of considerable depth or in other words by making the body 10 through that part of the roof portion unoccupied by the buttons 19 comparatively thin.

In connection with the foregoing, it should be observed that not only are portions of the body 10 visually distinguishable because of their color differences but also that these portions are of different light transmittance. Transmittance may be defined as that fraction of the radiant energy entering a layer of a medium which reaches its further boundary while transmission is that fraction of the energy which passes beyond the further boundary of the medium. If the upper and lower surfaces 11 and 12 of the hemacytometer are each considered as composed of a boundary layer of infinitesimal thickness represented by the lines in Figure 3 forming these surfaces, then the medium concerned will extend from the exterior of the lower surface including the exterior of the filter 20 to the interior of the boundary for the upper surface.

It is well known that some light loss will occur by reason of absorption even in a clear transparent body when light is passed therethrough. If light losses of this nature are made large enough and of a sufficiently different magnitude in different portions of a body such as that just described, the different portions will be visually distinguishable from each other. At the same time, these just assumed portions will have a different light transmittance, which term will take into consideration the light losses in the body. With regard to the foregoing and with reference to Figures 1 through 3 of the drawing, it will be evident that the inner portions of the hemacytometer which surround the ruled areas 16 will, insofar as normal visual inspection is concerned, have the same transmittance as the outer portion which surrounds the recess 17 of the body. On the other hand, due to the absorption of the filter, the intermediate portion of the hemacytometer over the recess will have a lower transmittance than either the outer or inner portions of the body which will be sufficient to produce the desired contrast.

The value of forming the hemacytometer with the visually distinguishable portions will be well appreciated when it is realized that they provide extremely simple and effective means for locating the ruled areas in the field of a microscope which is in an unfocused condition. For example, with the hemacytometer on a microscope stage it is a relatively simple matter to find the colored intermediate portion of the body. This portion is relatively large and is surrounded by an outer portion which is either clear or of such a contrasting color to the intermediate portion that the eye distinguishes the difference at once if either portion is brought into the field of the microscope. Where the outer portion is in the field of view, the microscopist knows that the colored intermediate portion is inwardly located from it and moves the hemacytometer accordingly to locate the colored portion. The colored intermediate portion fills the field of the microscope with light of a color corresponding to the filter and guides the observer in moving the hemacytometer to locate a ruled area which he knows is positioned inwardly of the intermediate portion.

When a ruled area is found or located, despite the fact that the microscope is unfocused, an observer will see a field of white light if the body of the hemacytometer is of clear glass or a colored field where colored glass is used in the body. Having located a ruled area, it is brought into focus after which any fine adjustment of its position may be readily made in preparation for its microscopic examination.

One feature of the construction which should be noted is the fact that the filter 20 is located within the recess 17. By reason of this, the filter is protected from wear and other damage received in use and in handling. Similar protection is afforded to the portions of the buttons 19 located within the recess 17.

The principles heretofore set forth may be embodied in other forms of devices besides those illustrated in Figures 1 through 3 of the drawing. For example, there is disclosed in Figure 4 a hemacytometer having a one-piece body of clear transparent material such as glass which has been molded into the identical shape of the body 10 of Figures 1 through 3. Body 21 differs from body 10 only in the filter means employed.

In Figure 4 the filter means are provided by flashing suitably colored glass, of one of the colors described, onto the lower surface of the body 21. This provides a covering 22 of colored glass which is spread not only over the support portion of the lower surface but also over the sides and roof portion 18 of the recess 17 and also the buttons 19. The hemacytometer is finished by entirely grinding away the covering 22 of colored glass on the support portions of the bottom surface of the body 21, after which these support portions are polished. This condition is indicated by the dotted line 23 which will form the boundary of the completed bottom surface. Grinding of his type leaves the roof portion of the recess provided with a filter or covering of glass 22. At the same time the covering 22 is spread over the depending surface of each button and also the sides of the recess. While the colored covering may be removed from these last mentioned parts of the body 21, it is generally impractical to do so. Diffusion, of a nature detrimental to the visual contrast between the different portions of the body 21, caused by a colored covering being spread over the entire surface within the recess, may be rendered negligible by suitably choosing the proportions of the various elements making up the hemacytometer in the manner already indicated.

In Figure 5 I disclose a device having a body 24 which, with one exception, is identical to the body 10 of the hemacytometer of Figures 1 through 3. The modification in question resides in the elimination of the filter coating 18 shown in Figures 2 and 3. This is made possible by forming the body 24 of colored glass of suitable optical density and by suitably proportioning the thickness for the different portions of the body.

As is well known, the absorption loss for light passing through a glass plate of two units thickness is considerably greater than the light loss where the plate is only one unit thick. To put this another way, the plate of unit thickness has a greater light transmittance than the plate of two units thickness. Another factor, namely, the absorption characteristics of the glass itself, enters into the value for the light transmittance for a glass plate. For example, of two glasses, the one having the least absorption will have the greatest transmittance. By the utilization of these means it will be appreciated that I am able to provide a transparent body having an intermediate portion of a particular saturation and brilliance which is visually distinguishable from two inner portions and an outer portion, the latter portions being of the same hue as the intermediate portion but of different saturation and brilliance and appear in darker relation thereto.

Figures 6 and 7 illustrate a modification of the invention wherein the transparent body 25 is provided with a transverse channel 26 extending entirely across the lower surface of the hemacytometer instead of a recess. Buttons 19 are formed within the channel. The remainder of the body 25 is identical to the hemacytometer shown in Figures 1 through 3. By slight constructional changes, it will be appreciated that the design of Figures 6 and 7 may be utilized to form the types of hemacytometers shown in Figures 4 and 5.

In the foregoing, I have described means for accomplishing the aims and objects of my invention and have disclosed a simple and hence an inexpensive construction for hemacytometers. By providing effective locating means on a hemacytometer, I have enabled the art to overcome a problem of a nature even vexatious to the most skilled microscopist.

While I have shown and described the preferred embodiment of my invention, I wish it to be understood that I do not confine myself to the precise details of construction herein set forth as it is apparent that they are susceptible to many changes and variations which will fall within the spirit of the invention and the scope of the claims hereto appended.

I claim:

1. A hemacytometer having a transparent body with a top and a bottom surface, said bottom surface being formed with a support portion adapted to seat on a microscope stage and also formed with a central recess having a roof portion, a plurality of buttons depending from the roof portion of said recess and located in perpendicular relation to the top surface of said body, each button having its base adjacent the roof portion entirely surrounded by the latter, light filter means formed on the area of the roof portion unoccupied by the base of any button and a plurality of ruled areas, one for each button, formed on said top surface, each ruled area being located on said top surface in centered alignment over the base of its corresponding button.

2. A hemacytometer having a transparent body which has a plurality of visually distinguishable portions extending therethrough from the top to the bottom surface of the body, said portions comprising a plurality of relatively thick inner portions which are centrally located with respect to the ends of said body, a relatively thin intermediate portion which bounds said inner portions and a relatively thick outer portion which bounds said intermediate portion, said outer and inner portions having approximately similar light transmittance which transmittance is sufficiently different from that of the intermediate portion to cause the last mentioned portion to appear in distinct visual contrast to the inner and outer portions, and ruled areas on a surface of said body, each ruled area being located in alignment with an inner portion.

LEIGH B. HALL.